US007512255B2

(12) United States Patent
Kakadiaris et al.

(10) Patent No.: US 7,512,255 B2
(45) Date of Patent: Mar. 31, 2009

(54) MULTI-MODAL FACE RECOGNITION

(75) Inventors: Ioannis Kakadiaris, Houston, TX (US); Theoharis Theoharis, Houston, TX (US)

(73) Assignee: Board of Regents, University of Houston, Houston, TX (US)

( * ) Notice: Subject to any disclaimer, the term of this patent is extended or adjusted under 35 U.S.C. 154(b) by 764 days.

(21) Appl. No.: 10/923,982

(22) Filed: Aug. 23, 2004

(65) Prior Publication Data

US 2005/0084140 A1    Apr. 21, 2005

Related U.S. Application Data

(60) Provisional application No. 60/497,295, filed on Aug. 22, 2003.

(51) Int. Cl.
*G06K 9/00* (2006.01)
*G06K 9/54* (2006.01)
*G06K 7/00* (2006.01)

(52) U.S. Cl. .................. 382/118; 382/305; 382/312

(58) Field of Classification Search .......... 382/103, 382/115, 118, 240, 305, 312
See application file for complete search history.

(56) References Cited

U.S. PATENT DOCUMENTS

| 5,163,094 A | 11/1992 | Prokoski et al. ............. 382/2 |
| 5,164,992 A * | 11/1992 | Turk et al. ................. 382/118 |
| 5,719,951 A * | 2/1998 | Shackleton et al. .......... 382/118 |
| 6,173,068 B1 * | 1/2001 | Prokoski ................... 382/115 |
| 7,190,829 B2 * | 3/2007 | Zhang et al. ............... 382/165 |
| 7,221,809 B2 * | 5/2007 | Geng ....................... 382/280 |
| 2001/0033675 A1 * | 10/2001 | Maurer et al. .............. 382/103 |
| 2003/0108223 A1 | 6/2003 | Prokoski ................... 382/115 |

OTHER PUBLICATIONS

International Preliminary Examining Authority, "PCT Notification of Transmittal of International Preliminary Report on Patentability (cont'd) (Chapter II of the Patent Cooperation Treaty)," 4 pgs., PCT/US04/27273, Dec. 21, 2006.
P. Phillips, M.H., S. Rizvi, and P. Rauss, The Feret evaluation methodology for face-recognition algorithms. IEEE Transactions on Pattern Analysis and Machine Intelligence, 2000. 22(10): p. 1090-1104.
P. Phillips, P.G., R. Michaels, D. Blackburn, E. Tabassi, and J. Bone, Face recognition vendor test 2002. NIST, 2003.
Acheroy, C.B.a.M. Automatic face verification from 3D and grey level clues. in 11th Portuguese Conference on Pattern Recognition. 2000. Porto, Portugal.

(Continued)

*Primary Examiner*—Kanji Patel
(74) *Attorney, Agent, or Firm*—Jennifer S. Sickler; Gardere Wynne Sewell LLP

(57) ABSTRACT

A method for identifying an individual includes the steps of collecting data from an individual's face using visible and infrared cameras, processing the acquired data, fitting a geometric model template of the face to the data according to a mathematical method, processing the fitted model to extract relevant first metadata, storing the first metadata in a machine readable format, and comparing second metadata to the first metadata, to determine their degree of similarity in order to identify the individual.

44 Claims, 12 Drawing Sheets
(9 of 12 Drawing Sheet(s) Filed in Color)

OTHER PUBLICATIONS

C. Chua, F.H., and Y. Ho. 3D human face recognition using point signature. in Fourth IEEE International Conference on Automatic Face and Gesture Recognition. 2000.

A. Bronstein, M.B., and R. Kimmel. Expression-invariant 3D face recognition. in Audio and Video-based Biometric Person Authentication (AVBPA). 2003.

K. Bowyer, K.C., and P. Flynn. A survey of 3D and multi-modal 3D+2D face recognition. in International Conference on Pattern Recognition,. 2004. England.

X. Chen, P.F., and K. Bowyer. Visible-light and infrared face recognition. in Workshop on Multimodal User Authentication (MMUA). 2003. Santa Barbara, CA, USA.

K. Chang, K.B., and P. Flynn. Face recognition using 2D and 3D facial data. in Workshop on Multimodal UserAuthentication (MMUA),. 2003. Santa Barbara, CA, USA.

C. Mandal, H.Q., and B. Vemuri. Dynamic smooth subdivision surfaces for data visualization. in IEEE Visualization. 1997. Phoenix, AZ, USA.

Farkas, L., Anthropometry of the Head and Face. 1994: Raven Press.

T. Theoharis, G.P., and E. Karabassi. The magic of the z-buffer: A survey. in WSCG. 2001. Pilsen, CZ.

G. Papaioannou, E.K., and T. Theoharis, Reconstruction of three dimensional objects through matching of their parts. IEEE Transactions on Pattern Analysis and Machine Intelligence, 2002. 24(1): p. 114-124.

P. Siarry, G.B., F. Durbin, and J. Haussy, Enhanced simulated annealing for globally minimizing functions of many-continuous variables. ACM Transactions on Mathematical Software, 1997. 23(2): p. 209-228.

Metaxas, D.D.a.D. The integration of optical flow and deformable models with applications to human face shape and motion estimation. in CVPR. 1996.

Metaxas, D.D.a.D., Optical flow constraints on deformable models with applications to face tracking. International Journabf Computer Vision, 2000. 38(2): p. 99-127.

D. DeCarlo, D.M., and M. Stone. An anthropometric face model using variational techniques. in SIGGRAPH. 1998.

O'Brien, G.T.a.J.F. Shape transformation using variational implicit functions. in SIGGRAPH. 1999.

Gascuel, M.D.a.M.P. Animating Soft Substances With Implicit Surfaces. in SIGGRAPH. 1995.

D. Hoffman, A.F.a.D.K., Distributed approximating functional approach to fitting multidimensional surfaces. Chemical Physics Letters, 1996. 262: p. 393-399.

Frishman, A.M., Hoffman, D.K., Arnold, M., Rakauskas, R.J. and Kouri, D.J., Distributed approximating functional approach to fitting and predicting potential surfaces. 1. Atom-atom potentials. Chemical Physics Letters, 1996. 256(6): p. 684.

\* cited by examiner (a) $S^0$  (b) $S^1$  (c) $S^3$ (a)

(b)

(a)  (b)  (c)

MULTI-MODAL FACE RECOGNITION

CROSS-REFERENCES TO RELATED APPLICATIONS

This application claims the benefit of U.S. provisional patent application No. 60/497,295, filed Aug. 22, 2003.

STATEMENT REGARDING FEDERALLY SPONSORED RESEARCH OR DEVELOPMENT

N/A

REFERENCE TO A "SEQUENTIAL LISTING"

N/A

BACKGROUND OF THE INVENTION

1. Field of the Invention

The present invention relates to a method and a system for providing or verifying the identification of an individual. More particularly, the present invention relates to a system, consisting of sensors of various modalities (visible and infrared cameras), as well as means for processing data acquired from an individual's face over time, that is capable of fitting a geometric model template of the face to the data according to a mathematical method. In addition, the present invention relates to a mathematical method of processing the fitted model to extract relevant metadata, and storing them in a machine readable format. In addition, the present invention relates to a mathematical method that allows for comparison against other sets of metadata for the purpose of determining their degree of similarity to each other in order to provide or authenticate identification for the individual.

2. Description of the Related Art

It is increasingly important to identify and/or authenticate the presence of authorized personnel and to document non-authorized or suspicious personnel activities near critical installations, and at key points of entry, such as air, land, and sea ports.

Modern identification and authentication systems typically consist of an apparatus incorporating biometric sensors that capture data from the individual subject. The apparatus contains associated circuitry and hardware that process the data according to mathematical algorithms. The resulting data in a computer readable form is then stored (in the enrollment modality) or compared (in the identification/authentication modality) against a database of stored data. In a secured access environment, a positive match allows access to the facility.

Face recognition is an appealing biometric in that, unlike fingerprints and retina scans, it can be done passively and unobtrusively at a comfortable distance. Unfortunately, when currently available automated face recognition systems are employed in access control applications (cooperative subjects), their performance is suboptimal, and the accuracy degrades significantly when these systems are employed in surveillance (uncooperative subjects). Experiments conducted using the FERET database and during the FRVT 2002 study indicate that the success rate is not sufficient.

These 2D systems, even though they employ sophisticated models and are commercially available, can not overcome the inherent limitations of their input data and suffer from a number of flaws which hamper their accuracy. These flaws manifest themselves under the following conditions: F1) variable face poses, F2) variable face expressions, F3) variable lighting conditions, F4) accessories (e.g., glasses), F5) facial hair, F6) aging, F7) low image quality, and F8) disguises.

The main reason behind these flaws is the input and storage modality of these systems (generally 2D images) which, no matter how advanced the processing that follows, suffer from a lack of adequate basic information. A few recent attempts at other modalities (hybrid/3D data) have been lacking the proper processing algorithms that can take advantage of these more complex data forms.

2.1 3D Approaches

One prior art system collects the 3D data by projecting a structured light pattern on the subject's face, and taking three images from different poses. For recognition purposes, such system uses these curves as part of a global surface matching technique. Among the disadvantages of this method are its less than satisfactory performance results as well as its inability to handle facial expressions.

Another prior art system used point signatures for face recognition. It acquires the face in 3D, and then creates a point signature for each face. Recognition is handled by the matching of these signatures. In order to be expression-invariant, such system completely discards the lower part of the face, using only the upper part. In general, such method is not sensitive enough because much useful facial data is discarded.

Another prior art system used a non-rigid 3D face recognition approach. The acquired 3D data were transformed to a bending-invariant canonical form, which was analyzed to determine eigenvectors and eigenvalues. The experiments presented were extremely limited, and therefore no information about the robustness and accuracy of the method is available.

2.2 Multimodal Approaches

To overcome the inefficiencies of single modality face recognition systems, multimodal systems have also been introduced. One such prior art system combined visible and infrared images for face recognition. These images were analyzed using Principal Component Analysis, and the scores are fused to obtain the final score. Another system used 2D and 3D facial data as separate modalities in a multimodal system. The 3D data consisted of a depth image of the face. Again the final result is obtained using fusion of the individual results. However, such approach has the following limitations: 1) landmark points for each depth image were selected manually, and therefore the alignment is not automatic; 2) the input data used were regularly sampled range images (but most modern 3D scanners produce an irregularly triangulated 3D mesh); and 3) a separate training set is required.

Thus, there is a need in the art of face recognition for a practical, unobtrusive, and accurate face recognition system for convenient and effective access control in both constrained and unconstrained environments. This includes the development of robust and accurate algorithms for mining multimodal data, including both the raw sensor output (three-dimensional facial geometry and infrared images over time, hand geometry) as well as meta-data (e.g., geometry images and the network of blood vessels). A system is needed that exhibits high levels of rank-one recognition rate and robustness, remaining accurate in the presence of facial expressions, and not sensitive to the resolution of input data.

BRIEF SUMMARY OF THE INVENTION

The present invention provides a method and a system for providing or verifying the identification of an individual. More particularly, the present invention relates to a system, consisting of input sensors of various modalities (visible and infrared light cameras), as well as processing means, that is capable of acquiring data from an individual's face over time.

In addition, the present invention relates to a geometric model template of the face, which is annotated with anthropometric landmarks, segmented into areas of interest and parameterized over a two dimensional UV space.

The present invention also provides means for fitting a geometric model template of the face to the data acquired at each time instance (frame). The fitted model template at a certain time frame is known as an m-face. In addition, the present invention provides means for processing the set of m-faces corresponding to each individual to extract a unique identifying feature set of metadata and storing them in a machine readable format.

The present invention also provides means for deciding on whether two sets of metadata belong to the same individual in order to authenticate the individual's identity.

The present invention also provides means for ranking the entries of a database of previously stored metadata in a descending order according to their similarity to the new set of metadata and deciding on whether the best ranked entry provides positive identification for the individual.

BRIEF DESCRIPTION OF SEVERAL VIEWS OF THE DRAWINGS

The patent or application file contains at least one drawing executed in color. Copies of this patent or patent application publication with color drawing(s) will be provided by the office upon request and payment of the necessary fee.

DETAILED DESCRIPTION OF THE INVENTION

The database of m-faces are designated as reference m-faces, the input m-face is designated as the subject m-face, and the term recognition refers to both identification (or providing identification) and authentication (or verifying identification).

Figure 6:
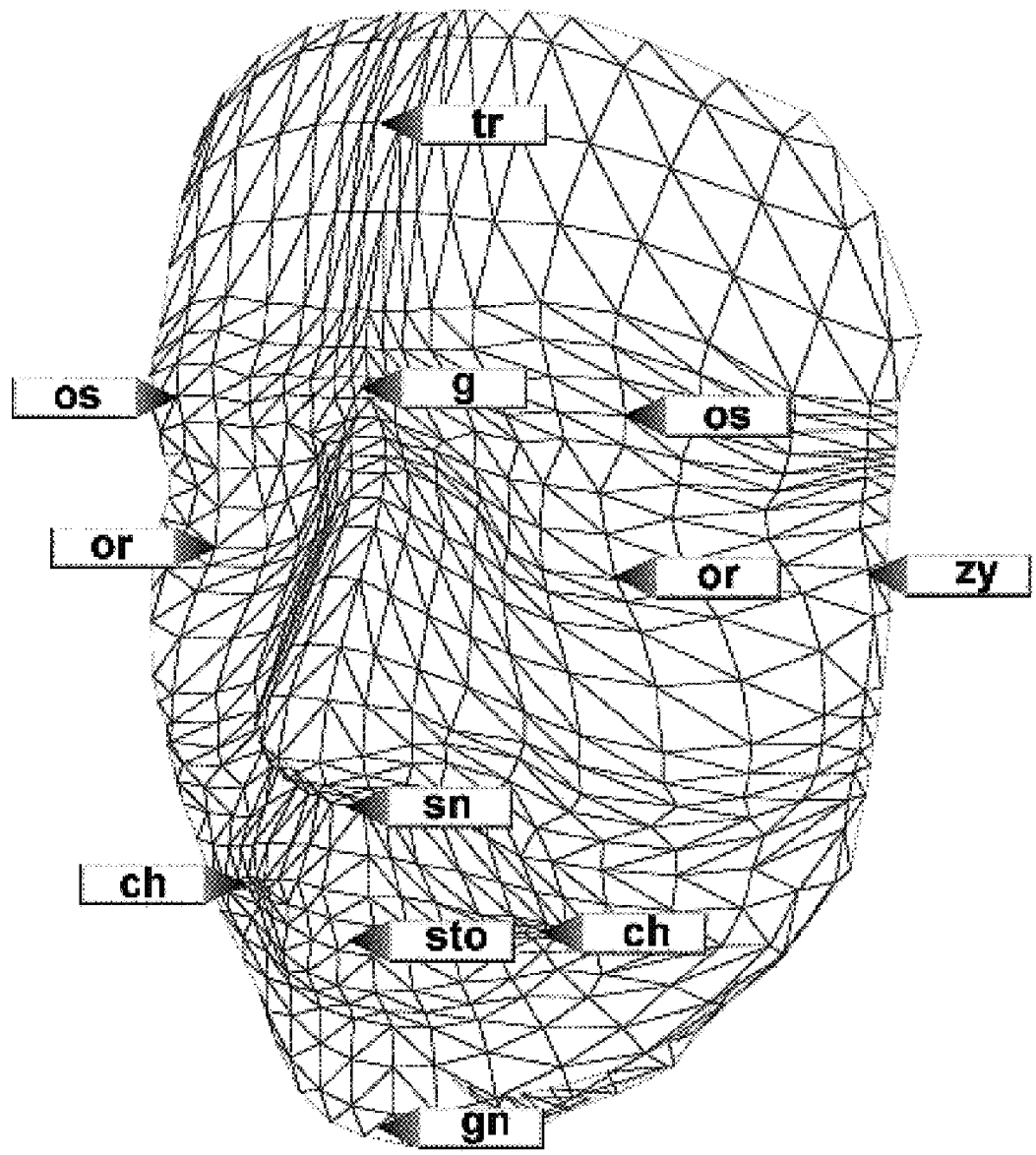
FIG. 6 illustrates the anthropometric landmarks of a human face.
Figure 7:
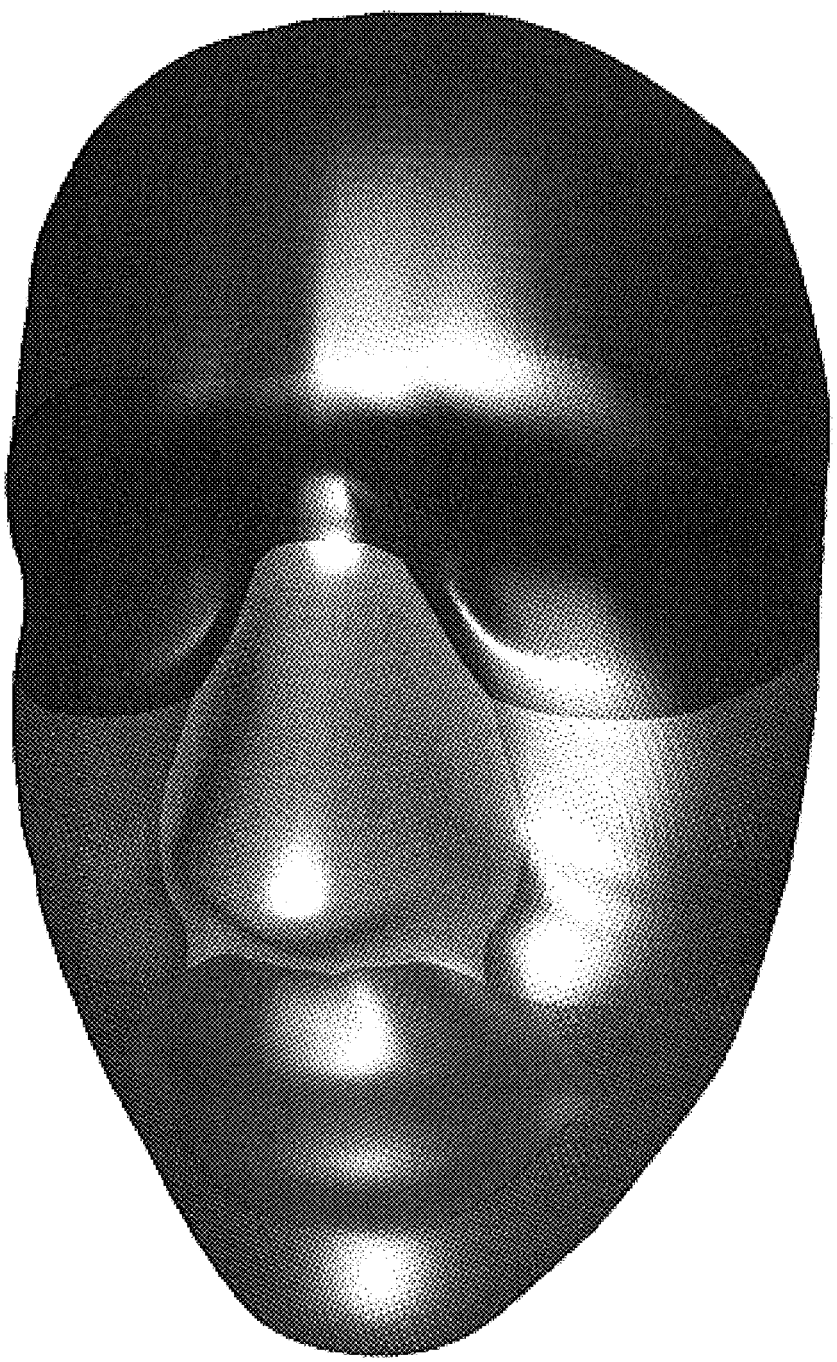
FIG. 7 illustrates facial area annotation.
Figure 8:
FIG. 8 illustrates AFM with checkerboard texture demonstrating the quality of the parameterization.

The present invention employs an Annotated Face Model (AFM), which is a 3D segmented facial model, also known as a geometric model template, annotated with anthropometric landmarks as shown in FIG. 6. These landmarks denote important features of the human skull and can be found on any face. The anthropometric landmarks are associated with the vertices of the underlying surface. The AFM represents an 'average' face and is segmented into the following areas as shown in FIG. 7: nose, mouth, eyes, chin, cheeks, brow and neck. A weight is associated with each area, which represents the measure of reliability, as detected from the infrared processing. The AFM is modeled using subdivision surfaces. The subdivision surface is (U, V)-parameterized using a sphere map function as illustrated in FIG. 8.

The AFM is used in the following ways:
  it is deformed to fit a subject/reference face, thus providing a segmentation correspondence for the face.
  it also provides (U, V) parameterization for a subject/reference face.
  it measures the amount of deformation required to fit a subject/reference face.
  it imposes limits on the above deformations using anthropometric constraints on the associated anthropometric landmarks.

Figure 1:
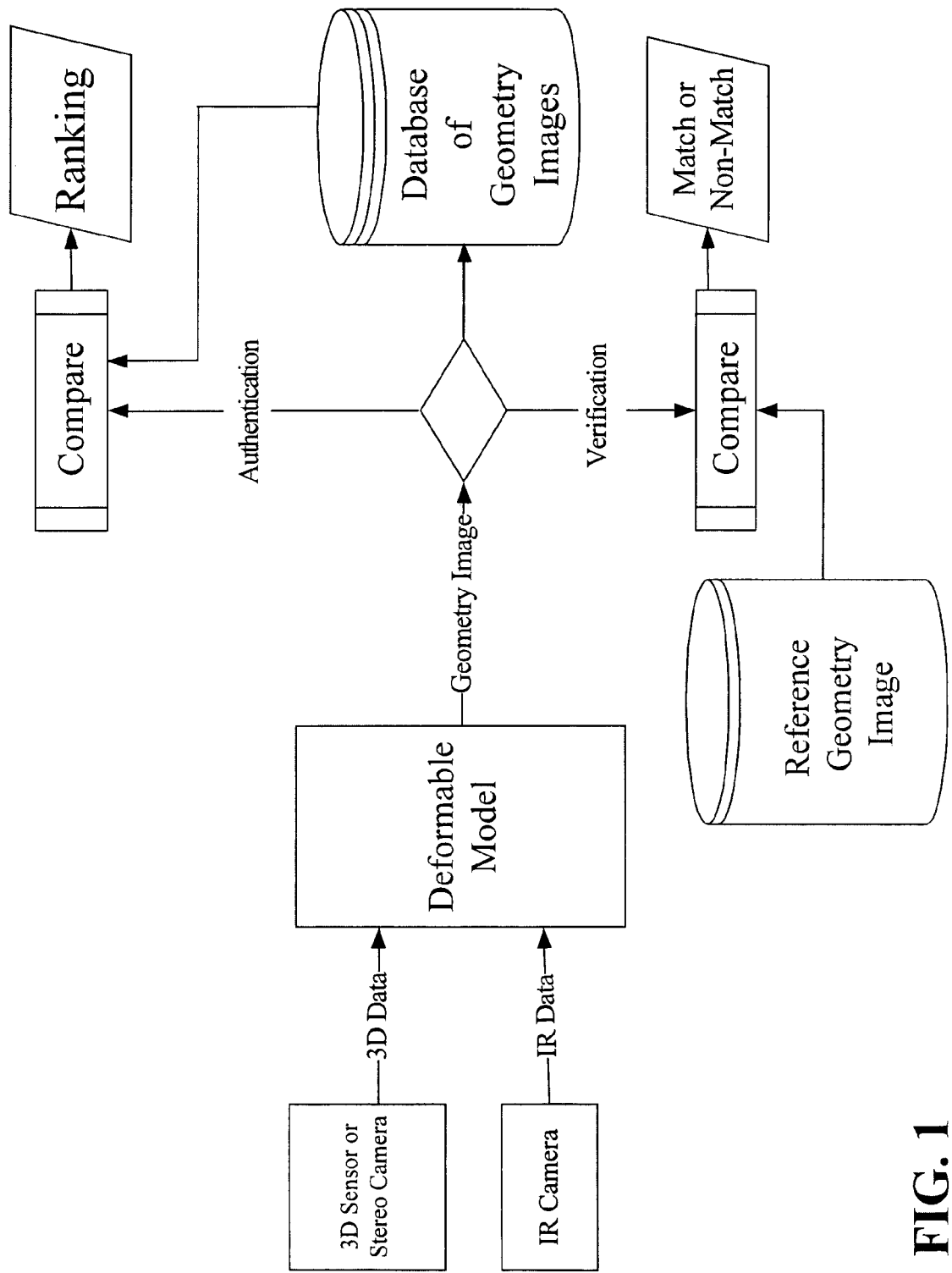
FIG. 1 illustrates an overview of the system, including acquisition, enrollment, and authentication/identification.

The method of the present invention consists of two phases, as shown in FIG. 1:

Enrollment Phase:

For every subject to be enrolled (m-face) repeat steps E1-E3:
  Step E1: Acquire sequence of multimodal data (3D from multiple visible light cameras, 2D infrared) (n time frames)
  Step E2: Detect the existence of facial hair or accessories in the infrared image and thus assign confidence factors to the AFM regions.
  Step E3: Construct the blood vessel graph representation from the IR images.
  Step E4: Deform the AFM to fit the subject mesh, using information from E2.
  Step E5: Create metadata from the deformed AFM.
  Step E6: Store subject's multimodal data/metadata to the database along with additional information (person-id, age, date of enrolment, etc).

Authentication/Identification Phase:

For the authentication/identification of a specific subject, the following steps are performed:

Step I1: Acquire sequence of multimodal data (3D from multiple visible light cameras, infrared) (n time frames)
Step I2: Detect the existence of facial hair or accessories in the infrared image and thus assign confidence factors to the AFM regions.
Step E3: Construct the blood vessel graph representation from the IR images.
Step I4: Deform the AFM to fit the subject mesh, using information from I2.
Step I5: Create metadata from the deformed AFM.
Step I6: Compare metadata to database of subjects' metadata (identification) or a specific subjects' metadata (authentication).

1. Dynamic Subdivision Framework

The method of the present invention utilizes the deformable model framework for data fitting purposes. For this framework, all the physical properties of a rigid or non-rigid object are analytically formulated, and then an approximating solution is computed. These properties, except for the usual mechanical properties (e.g., velocity, acceleration), include deformation properties of the surface of the object (e.g., strain energy, material stiffness). The surface of the object is represented by parametric surfaces, and the solution is computed using a Finite Element Method. Recently, Mandal et al modified the deformable framework so that it uses subdivision surfaces instead of parametric surfaces. The analytical formulation remains the same, but the FEM implementation is different and is adjusted for use with subdivision surfaces. The present invention uses the subdivision implementation because of the greater flexibility subdivision surfaces offer.

1.1 Loop Subdivision Scheme

Figure 2:
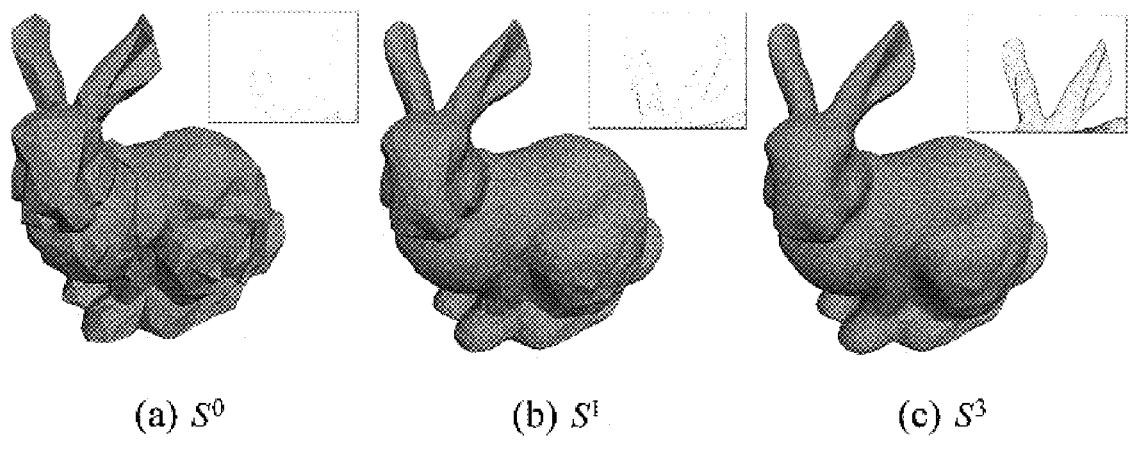
FIG. 2a illustrates a subdivision surface, including a control mesh
FIGS. 2b and 2c illustrate subdivision levels 1 and 3 using Loop's scheme.

The subdivision surface is defined by a polygonal mesh, called a control mesh, and a set of rules that control how the subdivision behaves. The subdivision process is performed in two steps. First, each polygon (either triangle or quad) is split in four, and then the vertices are repositioned. Depending on which subdivision scheme is used there are different rules for the positioning of the vertices. Obviously, after one subdivision step the surface has four times more polygons than before, as shown in FIG. 2. The successive application of this subdivision step infinite times produces a smooth surface called a limit surface.

The present invention uses the Loop Scheme, which is currently a popular subdivision scheme. It incorporates these features:

it can be applied on triangular meshes with vertices of arbitrary valence;
it produces a limit surface with $C^2$ smoothness property,
the smooth patch produced for a single triangle depends only on the vertices inside the 1-neighborhood area of the vertices of the triangle; and
it can be implemented in hardware for rendering purposes.

Figure 3:
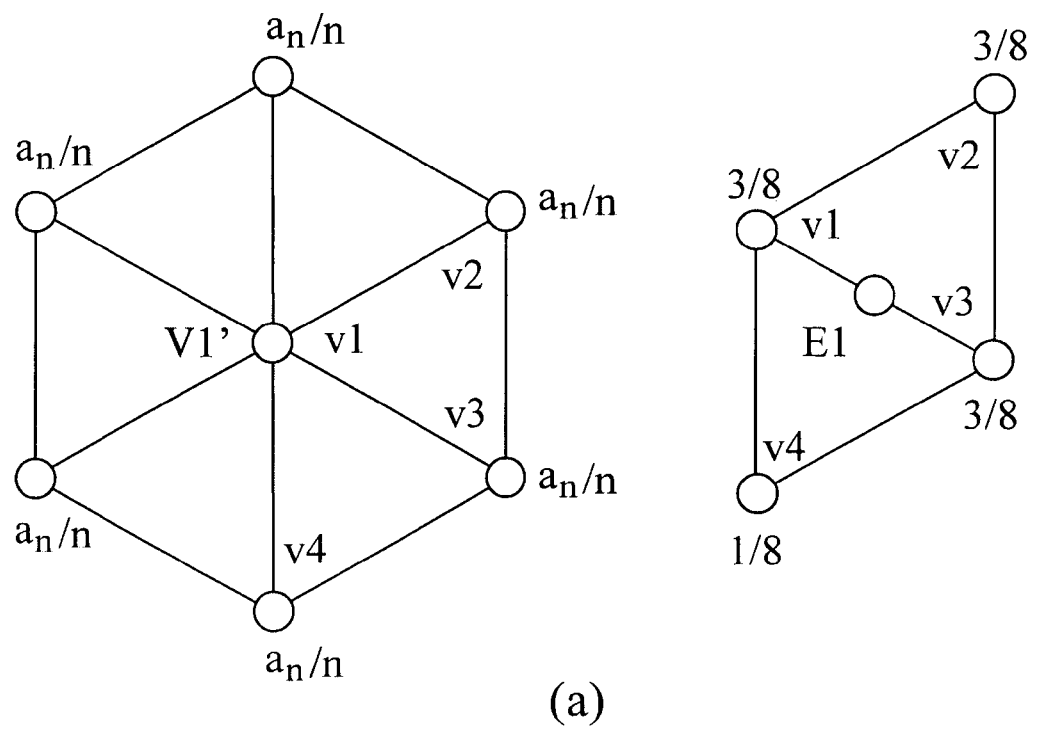
FIGS. 3a and 3b illustrate Notation for Loop rules for (a) internal and (b) external vertices.
Figure 3:
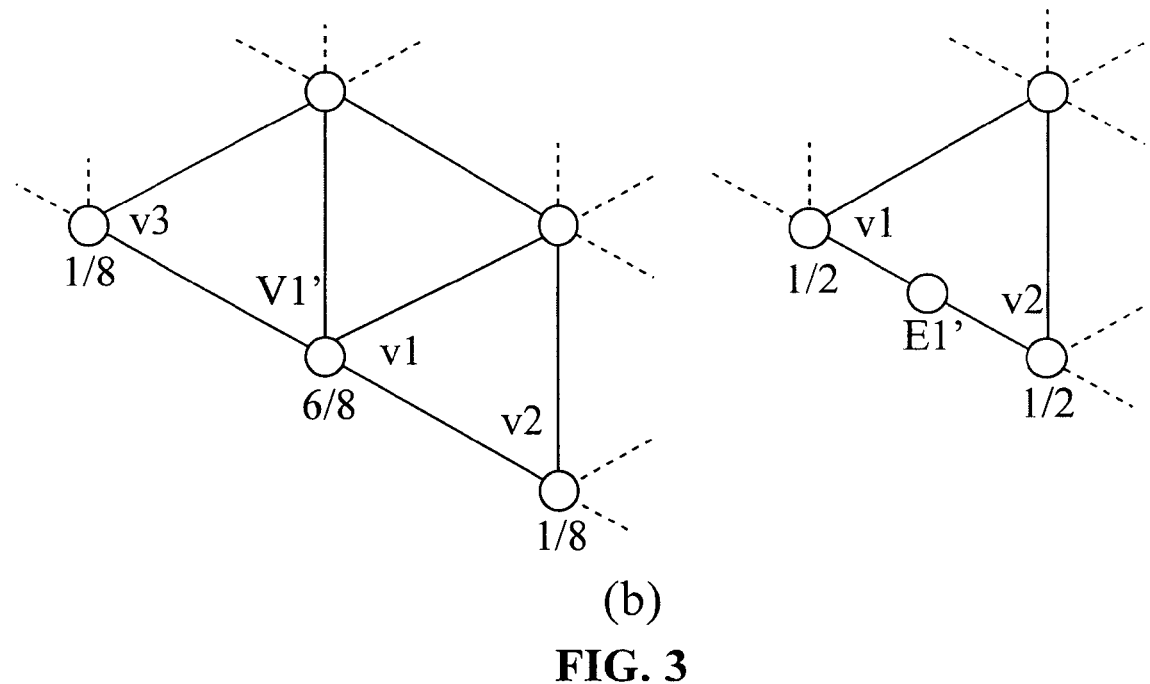

The Loop Scheme distinguishes the vertices in two categories, external and internal. For each category there are two cases, the already existing vertices, and the ones introduced on each edge so that the triangles quadruple. Using the notation of FIG. 3, for the internal category the new position of existing vertices is given by $$v_1 = (1-a_n)v_1 + \frac{a_n}{n}v_2 + \ldots + \frac{a_n}{n}v_{n+1} \text{ with}$$

$$a_n = \frac{1}{64}\left(40 - \left(3 + 2\cos\left(\frac{2\pi}{n}\right)\right)^2\right).$$

New edge points are given by $$e_1 = \frac{3}{8}v_1 + \frac{3}{8}v_3 + \frac{1}{8}v_2 + \frac{1}{8}v_4.$$

For the external category, the new position for existing vertices is given by $$v_1 = \frac{6}{8}v_1 + \frac{1}{8}v_2 + \frac{1}{8}v_3$$

and edge points are given by $$e_1 = \frac{1}{2}v_1 + \frac{1}{2}v_2.$$

The external vertices are handled differently, so that the boundaries of the surface do not change through the various subdivision levels.

1.2 Analytical Formulation

The deformation of a model is governed by the degrees of freedom assigned to it. This invention lets q represent the n degrees of freedom of the model. In the case of subdivision surfaces this vector is the concatenation of the vertices of the control mesh. The equation that controls the deformations of the model is the following:

$$M\frac{d^2q}{dt^2} + D\frac{dq}{dt} + Kq = f_q \tag{1}$$

where M is the n×n mass matrix, D the n×n damping matrix, K the n×n stiffness matrix and $f_q$ is the n×1 vector of the external forces.

The mass matrix is related with the kinetic energy of the model, whereas the damping matrix is related with the energy dissipation. In the implementation of the present invention, M=Ψ and D=Ψ because these two matrices have minimal importance in a data fitting application.

In a data fitting application the stiffness matrix is the most important component, because it resists the external forces, and determines elastic properties of the model. It can be decomposed in three matrices:

$$K = K_{fo} + K_{so} + K_{sp}.$$

Matrix $K_{fo}$ is related to the first order strain energy, matrix $K_{so}$ is related to the second order strain energy, and $K_{sp}$ is related to the spring forces energy $$E_{fo} = \frac{1}{2}\kappa_{fo}q^T K_{fo}q \qquad (2)$$

$$E_{so} = \frac{1}{2}\kappa_{so}q^T K_{so}q$$

$$E_{sp} = \frac{1}{2}\kappa_{sp}q^T K_{sp}q$$

where $\kappa_{fo}, \kappa_{so}, \kappa_{sp}$ are the individual weights.

1.3 Finite Element Method

The control mesh of the subdivision surface is used as the degrees of freedom of the model, whereas the the triangles of the limit surface, approximated by the $k^{th}$ subdivision level, are used as the finite elements. This means that each triangle in the control mesh is considered a finite element denoted by $F_i^0$, and is approximated by a triangular patch denoted by $F_i^k$. Every triangle inside the patch is used for computing the external forces and the stiffness matrix. Because the forces are actually applied in the control mesh and not in the limit surface, a way is needed to map the forces from the limit surface back to the control mesh.

Figure 4:
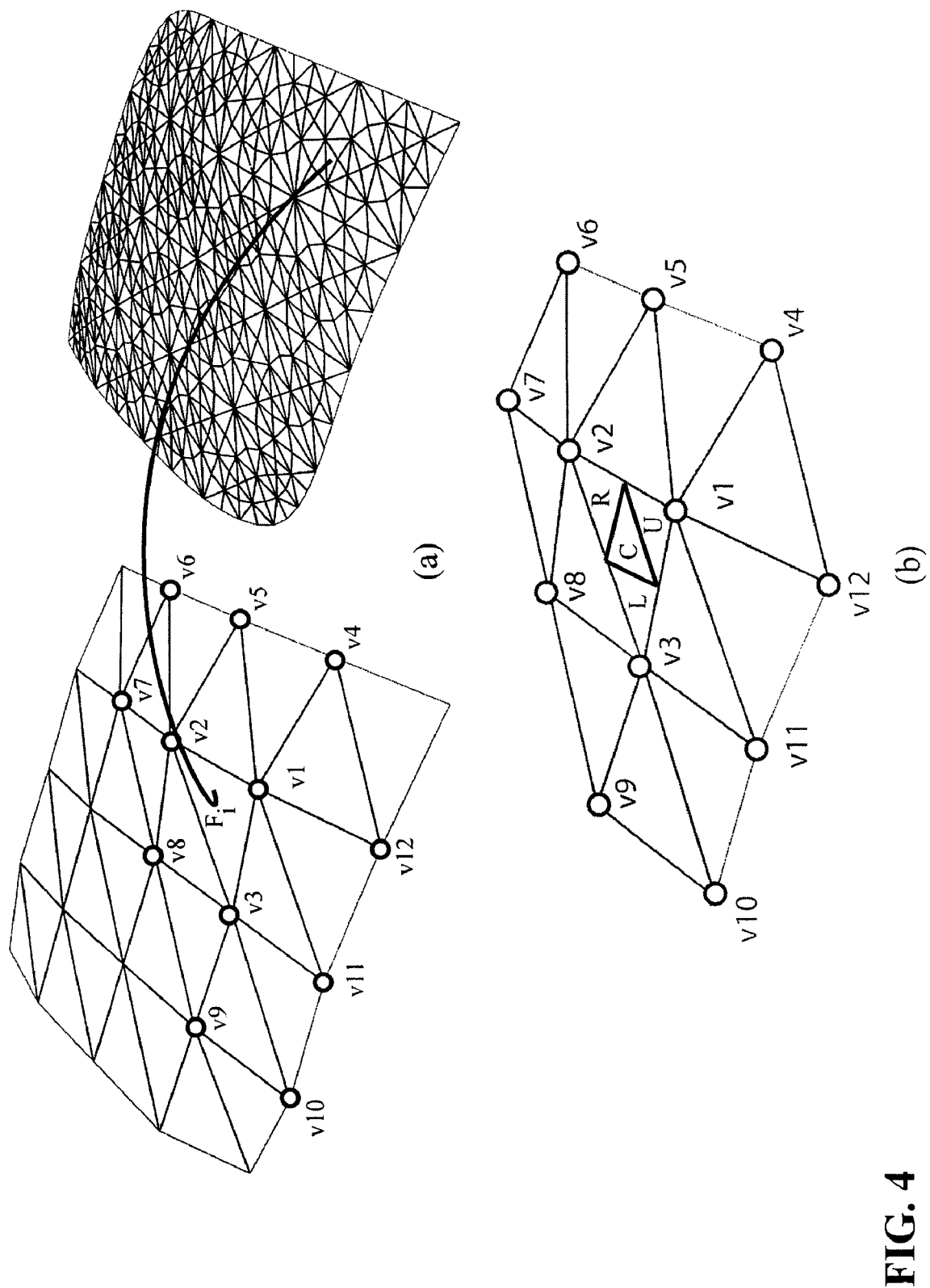
FIG. 4a illustrates a subdivision surface with control points and limit surface. Finite element $F_i^0$ depends on vertices $v_1 \ldots v_{12}$ and its associated surface patch is $F_i^3$.
FIG. 4b illustrates Up (U), left (L), right (R) and center (C) triangles produced by a single subdivision step

The answer to this problem lies in the way the triangular patch is computed by the Loop scheme. As an example, one can assume a mesh with valence six vertices. Then, using the one-neighborhood property of the Loop scheme, one needs a total of 12 vertices to compute the shape of $F_i^k$ independently of the actual value of k (FIG. 4(*a*)). One can create a vector $v_i$ that is the concatenation of these 12 vertices. The shape function of $F_i^k$ is given by $$s_i^k(x) = B_i(x)v_i \qquad (3)$$

where $s_i^k(x)$ is a 3×1 vector and $x=(\alpha,\beta,\gamma)$ are the barycentric coordinates of the triangle in which x lies in the limit surface. Equation 3 describes the points that lie in the limit surface with respect to the vertices in the control mesh. For a force computed in the limit surface one can use $B_i(X)^T$ to map it to the control mesh.

The matrix $B_i(x)$ is computed as follows. In the first subdivision level, there are four 12×12 subdivision matrices $A_U, A_C, A_L, A_R$, and each one transforms the vertices in $v_i$ differently, depending on whether one wants to produce the up, center, left, or right triangle (FIG. 4(*b*)). The subdivision matrix for the up triangle is given by:

$$A_U = \frac{1}{80}\begin{pmatrix} 50 & 5 & 5 & 5 & 0 & 5 & 5 & 5 & 0 & 0 & 0 & 0 \\ 30 & 30 & 10 & 10 & 0 & 0 & 0 & 0 & 0 & 0 & 0 & 0 \\ 30 & 10 & 30 & 0 & 0 & 10 & 0 & 0 & 0 & 0 & 0 & 0 \\ 30 & 10 & 0 & 30 & 0 & 0 & 10 & 0 & 0 & 0 & 0 & 0 \\ 10 & 30 & 30 & 0 & 10 & 0 & 0 & 0 & 0 & 0 & 0 & 0 \\ 30 & 0 & 10 & 0 & 0 & 30 & 0 & 10 & 0 & 0 & 0 & 0 \\ 30 & 0 & 0 & 10 & 0 & 0 & 30 & 10 & 0 & 0 & 0 & 0 \\ 30 & 0 & 0 & 0 & 0 & 10 & 10 & 30 & 0 & 0 & 0 & 0 \\ 10 & 30 & 0 & 30 & 0 & 0 & 0 & 0 & 10 & 0 & 0 & 0 \\ 5 & 50 & 5 & 5 & 5 & 0 & 0 & 0 & 5 & 5 & 0 & 0 \\ 5 & 5 & 50 & 0 & 5 & 5 & 0 & 0 & 0 & 0 & 5 & 5 \\ 10 & 0 & 30 & 0 & 0 & 30 & 0 & 0 & 0 & 0 & 0 & 10 \end{pmatrix}$$

The matrices $A_C, A_L, A_R$ can be constructed similarly. For subsequent subdivision levels, one just multiplies these matrices resulting in the matrix $A_i^k$ from which can be constructed the 36×36 matrix $$Ac_i^k = \begin{pmatrix} A_i^k & 0 & 0 \\ 0 & A_i^k & 0 \\ 0 & 0 & A_i^k \end{pmatrix}.$$

Finally, the method multiplies $Ac_i^k$ with the 3×36 matrix $Bc(x)$:

$$Bc(x) = \begin{pmatrix} \alpha & \beta & \gamma & \ldots & 0 & 0 & \ldots & \ldots & \ldots & 0 & 0 & \ldots & \ldots & \ldots & 0 \\ 0 & \ldots & \ldots & \ldots & 0 & \alpha & \beta & \gamma & \ldots & 0 & 0 & \ldots & \ldots & \ldots & 0 \\ 0 & \ldots & \ldots & \ldots & 0 & 0 & \ldots & \ldots & \ldots & 0 & \alpha & \beta & \gamma & \ldots & 0 \end{pmatrix}$$

to produce $B_i(x)$. For each triangle in $F_i^k$ the method of the present invention stores the sequence that produced it (for example up, left, left, center) in order to compute $B_i(x)$. Obviously $B_i(x)$ changes depending on which triangle of $F_i^k$ the point x lies.

1.3.1 Stiffness Matrix Computation

With $B_i(x)$ computed for each triangular patch, the computation of the stiffness matrix is straightforward. The spring force energy from Equation 2 for $F_i^k$ is $$E_{i,sp} = \frac{1}{2}\kappa_{sp}v_i^T K_{sp}v_i \qquad (4)$$

but also can be written as $$E_{i,sp} = \frac{1}{2}\kappa_{sp}\sum_{\Omega}\left|\frac{|v_a^k - v_b^k| - l_{a,b}}{|v_a^k - v_b^k|}(v_a^k - v_b^k)\right|^2$$

where domain $\Omega$ contains every pair of vertices $v_a^k, v_b^k$ that share an edge in $F_i^k$ and $l_{a,b}$ is their distance before any deformation happens. Using the relationship that $v_i$ is the concatenation of all the vertices in the control mesh that affect $F_i^k$ in Equation 3, this is equivalent to $$E_{i,sp} = \frac{1}{2}\kappa_{sp}\sum_{\Omega}\left|\frac{|v_a^k - v_b^k| - l_{a,b}}{|v_a^k - v_b^k|}(s_i^k(x_a) - s_i^k(x_b))\right|^2 \text{ and}$$

$$E_{i,sp} = \frac{1}{2}\kappa_{sp}\sum_{\Omega}\left|\frac{|v_a^k - v_b^k| - l_{a,b}}{|v_a^k - v_b^k|}(B_i(x_a) - B_i(x_b))v_i\right|^2$$

where $v_a^k = s_i^k(x_a)$ and $v_b^k = s_i^k(x_b)$. This can be rewritten as $$E_{i,sp} = \frac{1}{2}\kappa_{sp}\sum_{\Omega}\left(\frac{|v_a^k - v_b^k| - l_{a,b}}{|v_a^k - v_b^k|}\right)^2 [(B_i(x_a) - B_i(x_b))v_i]^T [(B_i(x_a) - B_i(x_b))v_i]$$

and then $$E_{i,sp} = \frac{1}{2}\kappa_{sp}\sum_{\Omega}\left(\frac{|v_a^k - v_b^k| - l_{a,b}}{|v_a^k - v_b^k|}\right)v_i^T (B_i(x_a) - B_i(x_b))^T (B_i(x_a) - B_i(x_b))v_i$$

Finally by combining this with Equation 4 is obtained $K_{sp}$ $$E_{i,sp} = \frac{1}{2}\kappa_{sp}v_i^T\underbrace{\left[\sum_{\Omega}\left(\frac{|v_a^k - v_b^k| - l_{a,b}}{|v_a^k - v_b^k|}\right)^2 (B_i(x_a) - B_i(x_b))^T (B_i(x_a) - B_i(x_b))\right]}_{K_{sp}}v_i$$

The derivation of $K_{fo}$ and $K_{so}$ is similar. Their final form is the following:

$$K_{fo} = \sum_{\Omega}(B_i(x_a) - B_i(x_b))^T(B_i(x_a) - B_i(x_b))$$

where domain $\Omega$ is the same as in $K_{sp}$ and $$K_{so} = \sum_{\Omega'}(B_i(x_a) - 2B_i(x_b) + B_i(x_c))^T(B_i(x_a) - 2B_i(x_b) + B_i(x_c))$$

where domain $\Omega'$ contains all the triplets of vertices for all the triangles in $F_i^k$.

The stiffness matrix is computed per each triangular patch, and then the individual stiffness matrices are combined to create a global stiffness matrix. To do so the method of the present invention keeps the position of the individual vertices of each finite element in the global vector q.

1.3.2. External Forces Computation

The external forces are handled in a similar way with the stiffness matrix. A force applied on a vertex $v_a^k$ of $F_i^k$ when multiplied by $B_i(x_a)^T$ is distributed on the 12 vertices that control this element. These forces are then added to the global external forces vector. This property contributes to smoother results because even when a single force is applied to the limit surface, more than one control vertices are affected.

The external forces are in general proportional to the distance between the point in the limit surface and the point in the raw data. It is desirable though to suppress them if the distance is too large, because the resulting external force will cause extensive deformation in a single iteration. For this purpose the following function is used:

$$\text{force}(d) = \begin{cases} d, & \text{if } d \leq 1 \\ \sqrt{d}, & \text{if } d > 1 \text{ and } d \leq 4 \\ \frac{2}{(d-3)^2}, & \text{if } d > 4 \end{cases}$$

Figure 5:
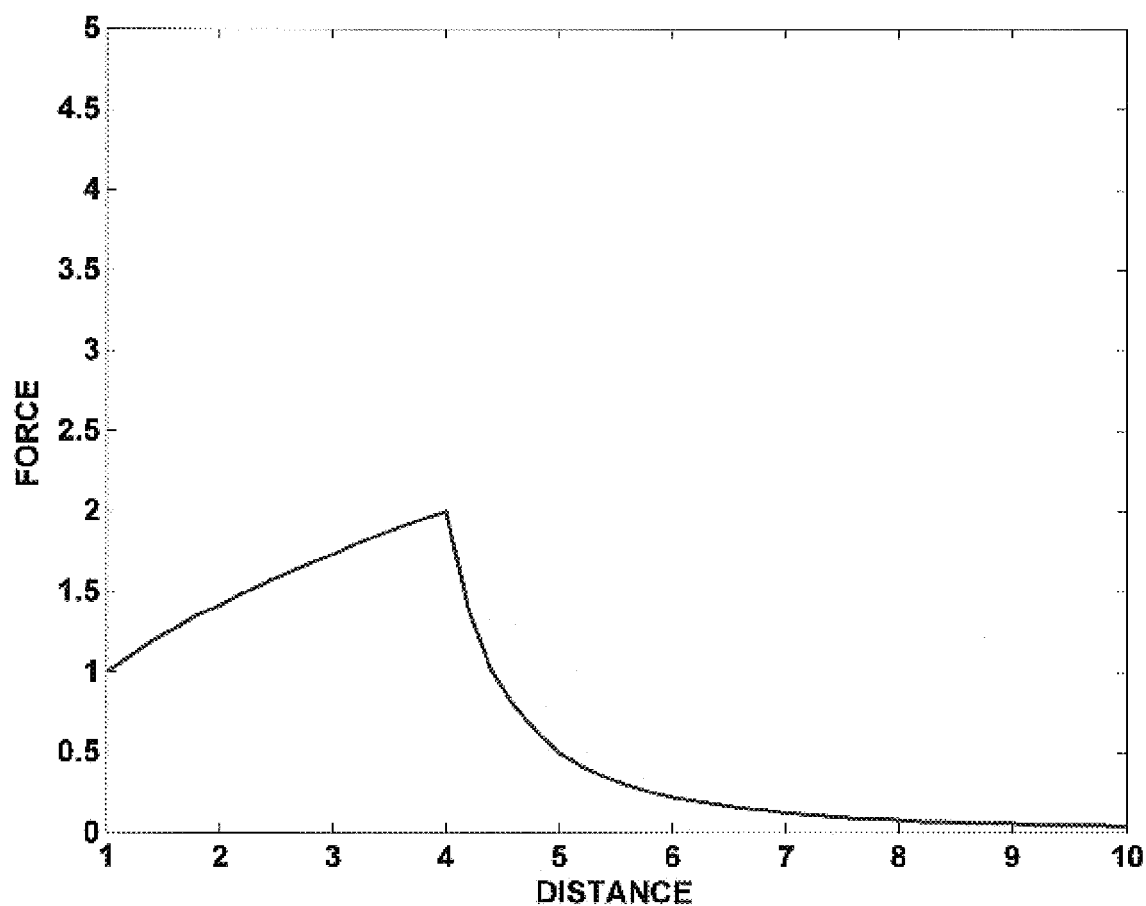
FIG. 5 is a graph illustrating the function that controls the magnitude of the external forces with respect to the distance between the points that cause this force.

This function, also depicted in FIG. 5, is $C^0$ continuous. If different thresholds than 1, 4 are selected, then the function must be altered in order to satisfy the $C^0$ property.

2. Annotated Face Model

In many applications of deformable models, the model itself is based on simple parametric objects such as spheres or ellipses. Because the method of the present invention uses the model on the narrow domain of face recognition, the method uses an initial model with the characteristics of a human face. Specifically, the method of the present invention creates an Annotated Face Model (AFM) based on a average facial 3D mesh constructed using statistical data. Anthropometric landmarks are associated with its vertices, and by using information from facial physiology, the method of the present invention annotates the AFM to different areas. Finally, an explicit UV parameterization is applied to the model.

2.1 Anthropometric Landmarks

Referring now to FIG. 6, there are several landmarks identified on the human surface by anthropometry. These landmarks denote important features of the human skull, and can be found in any face. A large number of such landmarks has been published by Farkas, along with various measurements that use them on certain population groups. The method of the present invention uses some of these measurements as constraints for the deformation of the face model. To accomplish this, the method of the present invention first associates these landmarks with vertices of the AFM.

For practical reasons the method of the present invention uses only a subset of the Farkas landmarks shown in FIG. 6. The selection is made using the importance of the facial feature the landmark identifies. Additionally some landmarks are not employed because they are associated with details not present on the average model (such as the nostrils). Generally, these landmarks provide enough information about both height and width of face, nose, and mouth. Tables 1-4 present the name of the landmarks along with a description of their physical position, divided in groups.

TABLE 1

Anthropometric Landmarks on Face.

| Landmark | Name | Description |
|---|---|---|
| tr | Trichion | The point on the hairline in the midline of the forehead |
| ft | Frontotemporale | The point on each side of the forehead laterally from the elevation of the linea temporalis |
| sl | Sublabiale | The lower border of the lower lip or the upper border of the chin |
| g | Glabella | The most prominent midline point between the eyebrows |
| gn | Gnathion | The lowest median landmark on the lower border of the mandibe |
| zy | Zygion | The most lateral point of each zygomatic arch |

TABLE 2

Anthropometric Landmarks on Orbits.

| Landmark | Name | Description |
| --- | --- | --- |
| sci | Superciliare | The highest point on the upper borderline of each eye brow |
| or | Orbitale | Lowest point on the margin of each orbit |

TABLE 3

Anthropometric Landmarks on Mouth.

| Landmark | Name | Description |
| --- | --- | --- |
| ch | Cheilion | Points located at each labial commisure |
| li | Labiale inferius | The midpoint of the lower vermilion line |
| ls | Labiale superius | The midpoint of the upper vermilion line |

TABLE 4

Anthropometric Landmarks on Nose.

| Landmark | Name | Description |
| --- | --- | --- |
| n | Nasion | Point in the midline of both the nasal root and the nasofrontal structure |
| al | Alare | The most lateral point on each alar contour |
| sn | Subnasale | Point where the lower border of the nasal septum and the surface of the upper lip meet |
| prn | Pronasale | The most protruded point of the apex nasi |

2.2 Area Annotation

The AFM has been annotated into different areas by taking into consideration the face physiology. There is no standard way to annotate a human face. Therefore, the annotation is correlated to the needs of the specific application. FIG. 7 shows the annotation, with each area denoted by a different color. In general, the method of the present invention annotates the human face taking into consideration the facial features as well as anthropometric landmarks. The annotated areas, along with an associated set of fixed weights, are described in Table 5.

The first and most obvious criteria for the annotation are the facial features. Clearly, nose, eyes, chin, and mouth belong to different areas as being highly descriptive features. These are the areas a human relies upon to recognize a face. The rest of the face is annotated to three areas: brow, cheeks and neck. It is important that each area has uniform deformable properties so that it can be modelled correctly. More specifically, the chin is separate from the cheek area because the lower jaw is a rigid part of the human skull that moves in respect to the rest of the face. As depicted in FIG. 7, the mouth area is larger than what is commonly considered as mouth because it can be highly deformed by various facial expressions.

TABLE 5

Weights assigned to the annotated facial areas.

| Color | Description | Weight |
| --- | --- | --- |
| Yellow | Nose | 1.0 |
| Green | Mouth | 0.3 |
| Red | Eyes | 0.8 |
| Purple | Neck | 0.4 |
| Brown | Cheeks | 0.8 |
| Blue | Brow | 0.4 |

The annotated areas must also be consistent with the anthropometric landmarks. The method of the present invention uses many of these landmarks to define the borders of the areas, as seen in FIGS. 6 and 7. Any constraints that a landmark will apply to the deformation will affect two areas instead of one, if this landmarks lies on the border of these two areas.

The fixed weights assigned to the annotated areas represent a confidence level. The exact weights are determined experimentally, and may change while research progresses, and more data sets become available. The method of the present invention uses the following general rules for the selection of the weights. Areas that cannot be deformed by a human or be occluded by accessories or facial hair are assigned a high weight. The nose area is the one that has both of these advantages. Additionally, the area of the eyes is also assigned a high weight. The rest of the areas are assigned a moderate weight, with the mouth area having the lowest weight, because it can be easily deformed. The weights take into consideration the number of pixels that the associated area will cover when the face is projected to the UV space, and act as a normalization factor.

The above fixed weights are modified by taking into account the characteristics of a specific data set such as the existence of facial hair or accessories in each area.

2.3 UV Parameterization

A UV parameterization of the mesh is needed in both model fitting and face retrieval. Even though the mesh of the annotated face model is used as a control mesh of a subdivision surface, the subdivision surface itself does not provide a parameterization. Therefore, a UV parameterization is explicitly provided for the AFM.

The UV parameterization has certain properties:

Every point on the polygonal surface is mapped to a single UV point and vice versa. This allows the polygonal data to be transformed to an equivalent representation called geometry image.

There is low area distortion, meaning that the ratio of area in 3D space and UV space is approximately the same for every part of the surface.

Neighboring points in 3D space retain this characteristic in UV space.

To apply the parameterization to the mesh, the method of the present invention uses a sphere-mapping function borrowed from the texture-mapping techniques found in computer graphics. Thus, the method maps the 3D data to a sphere, and then wraps a plane to the sphere. The formula for this is the following:

$$u = \frac{1}{2} + \frac{\arcsin\frac{z}{\sqrt{x^2+z^2}}}{2\pi} \quad (5)$$

$$v = \frac{1}{2} + \frac{\arcsin\frac{y}{\sqrt{x^2+z^2+y^2}}}{\pi}$$

The proper placement of the sphere's center combined with the relatively low geometrical complexity of the human face causes every point on the polygonal surface to be mapped to a single UV point and vice versa. Additionally, because the method of the present invention maps the face, and not the head, the method of the present invention does not have to use the whole sphere, thus reducing area distortion. A sphere-mapping of a closed object would introduce distortions on the sphere's poles. Finally, the UV parameterization property that neighboring points in 3D space retain this characteristic in UV space is an inherent property of the sphere mapping technique. Referring now to FIG. 8, the method of the present invention used this parameterization to apply a checkerboard texture. The size of the squares remained approximately the same when rendered on the 3D mesh, and there are no visible discontinuities.

3. Deformable Model Fitting

Using the subdivision framework, the method of the present invention can fit the AFM to any new 3D facial mesh which will be referred to as candidate mesh. Data fitting is one of the applications where deformable models perform efficiently. The AFM deformation is driven by external forces that are applied by the candidate mesh, and is resisted by the internal forces that try to retain its shape. An additional set of external forces is applied due to the anthropometric constraints.

For every candidate mesh the method of the present invention performs the following steps:
aligns the candidate mesh with the AFM; and
deforms the AFM so that it fits the candidate mesh using additional anthropometric constraints.

These steps do not belong to the general framework, but are application specific and they are explained in detail below.

3.1 Automatic Alignment

The deformation on a dynamic model is divided into global and local. Usually when a parametric shape (e.g., sphere) is used as a template for the deformable model the global parameters are limited to the initial sphere position and size. For the method of the present invention, initial orientation greatly affects the outcome of the fitting process. More specifically, the AFM and the target mesh must be aligned so that corresponding facial features have minimum distance.

Recent work in the area of surface registration is extensive. The method of the present invention uses an approach that utilizes the available graphics hardware and more specifically the z-buffer. The method of the present invention takes into consideration the characteristics of a facial 3D mesh. The method of the present invention uses the z-buffer as a discrete description of the face, and minimizes the difference of the two faces' curvature. The curvature is approximated by the first derivative of the z-buffer. In prior art, six z-buffers were used per object so that they describe the object from all directions. The method of the present invention uses only one z-buffer that is perpendicular to the plane formed by the nose and ears. This choice was also dictated by the characteristic of today's 3D CCD based scanners. They do not provide full 360 degrees coverage, and usually they are limited to below 180 degrees, thus making the data on the side of the head extremely unreliable.

The two faces' relative pose is controlled by the parameter vector ω where $$\omega = [t_x, t_y, t_z, \phi, \theta, \psi, s] \quad (6)$$

where $(t_x, t_y, t_z)$ is the translation vector and $\phi, \theta, \psi$ are the rotation angles around x, y and z axes.

Finally, s is a global scale factor. The error metric $\epsilon_d$ is given by Equation 7, and is the sum of the difference of the first derivatives of the depth of the surfaces along x and y directions. Specifically:

$$\varepsilon_d = \frac{1}{A}\int\int_S \left( \left| \frac{\partial d_1(x,y)}{\partial x} - \frac{\partial d_2(x,y)}{\partial x} \right| + \left| \frac{\partial d_1(x,y)}{\partial y} - \frac{\partial d_2(x,y)}{\partial y} \right| \right) dS \quad (7)$$

where A is the surface area of the intersection S of the projections of the two face models on the XY plane and $d_1, d_2$ are the depths of the surfaces at point x,y. Because the method of the present invention uses the z-buffer to sample the surfaces, the method of the present invention uses the discrete version of this error metric.

Figure 9:
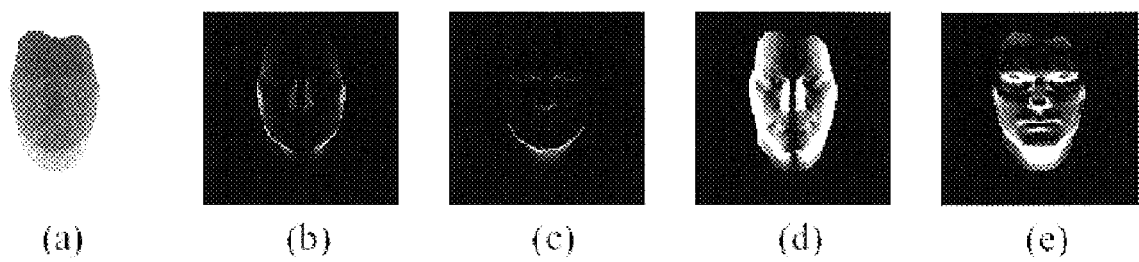
FIG. 9 illustrates (a) z-buffer, (b) x derivative, (c) y derivative, (d) thresholded x derivative, and (e) thresholded y derivative of a dataset.

The method of the present invention uses only one direction to obtain the z-buffer because the error metric is too sensitive to pixels with high curvature (typically found on the outline of the nose, chin and face). This initially posed a problem because the high curvature of these pixels dominated the optimization, because the contributions of the majority of the pixels was disregarded, and subsequently lead to incorrect alignments. The solution to this problem was to apply a threshold $T_d$ to the z-buffer derivative, with the results shown in FIG. 9. Any value greater than the threshold is mapped to $T_d$.

This creates heavily saturated derivative images, but gives good results.

In order to minimize the error metric given by Equation 7, the method of the present invention uses a global optimizer known as Enhanced Simulated Annealing. This method is an improved version of the original Simulated Annealing algorithm.

3.2 Anthropometric Constraints

The deformable framework computes the forces that are present on the surface and are caused by the deformation of the surface. Even though these forces ensure a smooth result they do not guarantee that the result will be a valid human face. Therefore, the method of the present invention applies an extra set of external forces that will constrain the deformation. These are provided from the anthropometric measurements, using the vertex-landmark correspondence described earlier.

Prior art methods implemented the constraint using a network of spring forces on the vertices. These springs have zero energy when the corresponding measurement has a value equal to the mean value for this measurement, and they gather energy when deviating from that value. The power of these constraints increases proportionally with the deviation from the mean values.

The method of the present invention uses the anthropometric measurements in a slightly different way. Prior art methods required that the model just approximates the face. The method of the present invention captures the details of the individual face; therefore the method of the present invention cannot bias towards the average measurements. Instead, the method of the present invention uses the standard deviation for each measurement as the threshold where the constraints start to apply a force to the model. As long as a certain measurement is within limits, no extra force will be applied. This does not mean that the internal spring forces of the deformable model will not also be applied. The method of the present invention views the forces from the anthropometric constraints as external forces independent from the internal ones.

4. Extraction of Metadata

After the fitting of the AFM has been completed, the first step in order to obtain the metadata that is used for recognition purposes is to create a geometry image from the deformed AFM, and perform wavelet analysis on it. When the method of the present invention has acquired data over a period of time, the method utilizes the following two different approaches to further process the metadata.

4.1 Geometry Image Creation

After the completion of the model fitting, the AFM describes the candidate face. It is possible to use directly the 3D data for the database search, but the method of the present invention uses a more flexible and compact way to describe the data. By using the UV parameterization that the method of the present invention applied on the model, the method reduces the data dimension space from $R^3$ to $R^2$, thus handling information redundancy. Also, when the data are converted to an image, the large bibliography about image retrieval from databases can be exploited.

In general, the deformation does not violate the properties described in section 2.3, thus allowing use of the parameterization on the deformed AFM. For every vertex n there is a correspondence with a pair of UV coordinates that did not change during the fitting. These vertices can be placed on the UV space, and they are resampled to create a smooth geometry image. Each triangular face in $R^3$ maps to a 2D triangle in $R^2$, and the UV coordinates corresponding to that triangle are computed through linear interpolation of its vertices $v_a$, $v_b$, $v_c$. Inside each triangle $\square_{ABC}$ the method of the present invention has:

$$gi\square_{ABC}(\alpha,\beta,\gamma)=\alpha v_a+\beta v_b+\gamma v_c \qquad (8)$$

where $\alpha,\beta,\gamma$ are the barycentric coordinates for a point in this triangle, and $gi\square_{ABC}(\alpha,\beta,\gamma)$ the value for the geometry image at these coordinates. This effectively resamples the data suppressing noise, and eliminates the effect of mesh resolution. The nature of the parameterization ensures that no point in UV space belongs to more than one triangle.

Figure 10:
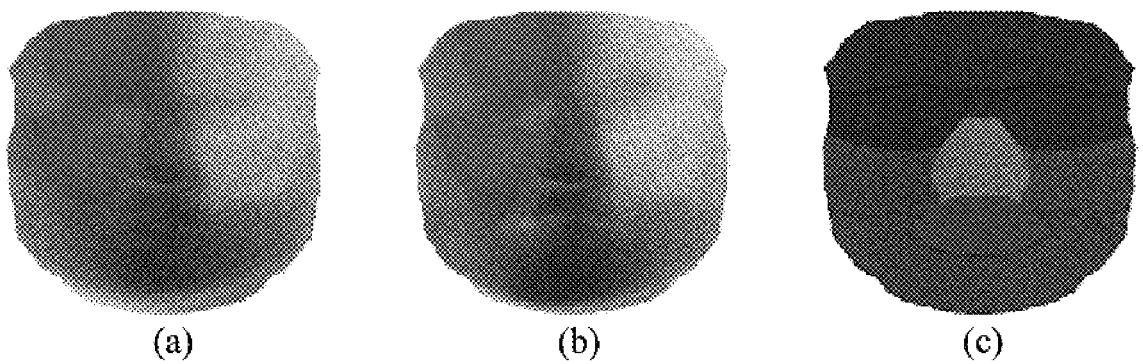
FIG. 10 illustrates facial geometry images as follows: (a) face in neutral expression, (b) face in 'fear' expression (mouth open and left eyebrow raised), and (c) map of annotated facial areas.

Referring now to FIG. 10, it depicts a geometry image of the AFM for two different facial expressions. The (x,y,z) coordinates are mapped into RGB space for visualization purposes. Not all UV space is covered. The areas that are not used are common in all geometry images, and correspond to areas with no vertex mapped to them. This is not an inconsistency, because it is a facial area with zero weight, thus having no contribution to the image comparison.

4.2 Wavelet Analysis

Figure 11:
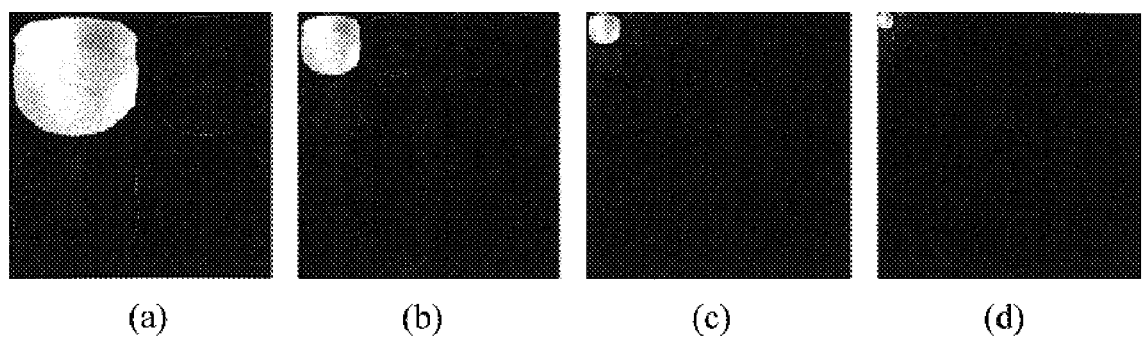
FIG. 11 illustrates Level 1-4 wavelet decomposition of a geometry image using the Walsh transform.

To compare the geometry images more robustly, the method of the present invention performs wavelet analysis. Specifically, referring to FIG. 11, the method of the present invention employs the Walsh wavelet transform with four levels of decomposition. The Walsh wavelet transform for images is a decimated wavelet decomposition using tens or products of the full Walsh wavelet packet system. The 1D Walsh wavelet packet system is constructed by repeated application of the Haar filter bank, a two-channel multirate filter bank based on the Haar conjugate mirror filter. Both channels output the result of convolving a 1D discrete signal with a Haar filter, and then downsampling by a factor of two (i.e., taking every other sample). The low-pass and high-pass Haar filters are g and h, respectively:

$$g = \frac{1}{\sqrt{2}}[1 \quad 1] \text{ and } h = \frac{1}{\sqrt{2}}[1 \quad -1].$$

For images, the method of the present invention uses tensor products of these 1D filters. This means that the filter bank operations are applied separately to the rows and columns of the image, resulting in a four channel filter bank with channels LL, LH, HL, and HH (corresponding to the filters $g^i*g$, $g^i*h, h^i*g$ and $h^i*h$ respectively). In other words, channel LL (low-pass) captures the local averages of the image, and channels LH, HL and HH (high-pass) capture horizontal, vertical and diagonal edges, respectively. The method of the present invention recursively applies this decomposition to each of the four output channels to construct the full Walsh wavelet packet tree decomposition. Conjugate mirror filter banks achieve perfect reconstruction, so the Walsh transform preserves all information originally present in the signal. The method of the present invention uses the Haar filter because it is the only quadrature mirror filter with finite impulse response.

Figure 12:
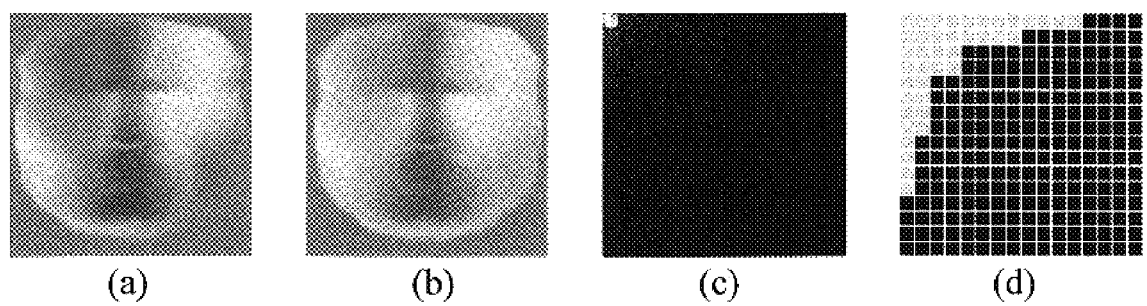
FIG. 12 illustrates wavelet analysis as follows: (a) original image, (b) reconstruction using 15% of the wavelet coefficients, (c) coefficients produced by a four-level decomposition and (d) mask used for selecting 40 out of 256 (15%) bands.

Because of the nature of the data, the method of the present invention expects many of the pixel lo values to follow distributions that correlate well with each other. The method of the present invention uses a mask to weigh individual bands (FIG. 12(d)) instead of selecting individual coefficients to keep. This allows reduction in the redundancy in the metadata, and comparison of two wavelet decompositions directly, without reconstructing the images. The mask favors the low-pass filters more because these capture most of the energy of the image. Additionally, it is symmetric with respect to the vertical and horizontal high-pass filters. In using the method of the present invention, it was found that 15% of the coefficients are adequate to get a fine approximation of the original image (FIG. 12(b)), because the reconstructed image retained 99.5% of the energy of the original image.

4.3 Geometry videos

In order to standardize the number of facial expressions captured from a subject, each one is asked to repeat the following excerpt from the rainbow passage: "When the sunlight strikes raindrops in the air, they act like a prism and form a rainbow. The rainbow is a division of white light into many beautiful colors. These take the shape of a long round arch, with its path high above, and its two ends apparently beyond the horizon. There is, according to legend, a boiling pot of gold at one end. People look, but no one ever finds it. When a man looks for something beyond his reach, his friends say he is looking for the pot of gold at the end of the rainbow."

The method of the present invention has chosen these sentences, motivated by the use of these sentences in the speech processing community, because these sentences incorporate a large number of phonemes. Face measurements are taken with the cameras at the rate of x frames/second, resulting in a sequence of metadata $G_0^k, G_1^k, \ldots, G_{L(k)}^k$ for each subject k. The length L(k) of this sequence will vary with each subject's enunciation speed.

4.3.1 Face Trajectories

In order to compensate for the variability in the lengths of these sequences (which is due to reading speed) the method of the present invention extracts a single trajectory curve $C^k(t)$ from each sequence $G_0^k, G_1^k, \ldots, G_{L(k)}^k$ by fitting a smooth curve through the sequence points. The method of the present invention then reparameterizes $C^k(t)$ to unit speed, with $G_0^k$ corresponding to $C^k(0)$ (time t=0) and $G_{L(k)}^k$ corresponding to $C^k(1)$ (time t=1).

4.3.1 Implicit DAFs

The sequence $G_0^k, G_1^k, \ldots, G_{L(k)}^k$ from a subject k constitutes a geometry video. Each frame $G_i^k$ is a 2-dimensional slice of a unit cube with the third dimension being normalized time. The method of the present invention constructs a single smooth potential (implicit) function $F^k$ that will describe this data. An implicit representation for a surface S is given by specifying a potential function F, defined over a volume V enclosing S. The implicit surface is defined to be the locus of points of zero potential for F, i.e., the points x in V such that F(x)=0. For example, the unit sphere centered at the origin can be described by either of the potential functions $F^+(x)=1-|x|$ or $F^-(x)=|x|-1$ (though it is customary to allow points inside the surface to have positive potential).

The problem of constructing an implicit representation for a surface S is closely related to scattered data point interpolation; that is, given a set of points $X=\{x_i\}$ in $\square^n$ with prescribed values $f_i$ find the "best" potential function F that interpolates these values at these points from within a class of functions with desired properties. The usual approach is to consider F as a linear combination of radially symmetric basis functions g (RBFs), centered at the points $x_i$, and try to solve for the set of linear coefficients while minimizing some type of cost/energy functional. That is, $$F(x)=\Sigma_i c_i g_i(x) \quad (9)$$

A different approach to the problem of solving for a potential function from scattered sampled data is the use of Distributed Approximating Functionals (DAFs). Instead of trying to represent the potential function as in Equation (9), the method of the present invention writes $$F(x)=\Sigma_i c_i(x) g_i(0) \quad (10)$$

Thus, the method of the present invention allows the coefficients to vary with x, and only evaluate at the origin. To calculate the $c_i$ one can pick a set of functions $h_i$ orthogonal to the $g_i$ under some weight set $w_i$. Then Equation (10) becomes $$F(x)=\Sigma_i h_i(0) \Sigma_j w_j(x-x_j) h_j(x-x) g(x_j) \quad (11)$$

The method of the present invention uses Hermite polynomial basis functions and Gaussian weights.

5. Metadata Comparison

In order to compare the metadata the method of the present invention uses a normed distance if the metadata are represented by points in a vector space (one frame case) or an integral distance if the metadata are represented by a curve or a function (multiple frames case). This distance produces a numerical score. The method of the present invention uses a fixed threshold for each distance to determine whether the two sets of metadata belong to the same individual.

While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modifications that may be made which do not depart from the scope and spirit of the invention as described above and claimed hereafter.

What is claimed is:

1. A method for positively identifying an individual, comprising:
   using an identification system to perform the steps of:
   a) acquiring data from an individual's face, using a plurality of input units of one or more modalities, to generate acquired data;
   b) processing the acquired data to generate a geometric image;
   c) using a generic geometric model template of the human face;
   d) fitting the generic geometric model template to the digital data of a candidate human subject according to a first mathematical method, to create a fitted model;
   e) extracting metadata from the fitted model to describe the individual according to a second mathematical method;
   f) storing the metadata in a machine readable format in a storage unit;
   g) ranking entries of a database of previously stored metadata in a descending order according to their similarity to a new set of metadata; and
   h) deciding whether the best ranked entry provides positive identification for the candidate human subject.

2. The method of claim 1, wherein the input units are visible and infrared light cameras.

3. The method of claim 1, further comprising, after the step of acquiring data, a step of using data from one modality of input units to assign a numerical confidence score to points of data from other modalities of input units, for the purpose of weighing them before further processing.

4. The method of claim 3, wherein the data used to assign a numerical confidence score to points of data from the other modalities comes from an infrared light camera.

5. The method of claim 1, further comprising a step of collecting and using data from an individual over time.

6. The method of claim 1, wherein the geometric model template is expressed using a subdivision surface.

7. The method of claim 1, wherein the geometric model template is annotated with anthropometric landmarks.

8. The method of claim 1, wherein the geometric model template is segmented into areas of interest.

9. The method of claim 1, wherein the geometric model template is parameterized over a two dimensional space.

10. The method of claim 1, wherein the first mathematical method is a physics-based deformable model theory with constraints.

11. The method of claim 10, wherein the constraints used are anthropometric.

12. The method of claim 1, wherein the second mathematical method is a wavelet transform.

13. The method of claim 12, further comprising a step of processing wavelet coefficients to be included in the metadata.

14. The method of claim 13, wherein the step of processing wavelet coefficients includes multiplication by a weight mask.

15. The method of claim 13, wherein the step of processing wavelet coefficients includes construction of a trajectory curve.

16. The method of claim 13, wherein the step of processing wavelet coefficients includes construction of an implicit function using radial basis functions.

17. The method of claim 13, wherein the step of processing wavelet coefficients includes construction of an implicit function using distributed approximating functionals.

18. The method of claim 1, wherein the ranking of the entries in the database in a descending order is according to a computation of a numerical score for each entry.

19. The method of claim 1, wherein the decision on whether the best ranked database entry provides positive identification for the individual is based on whether the numerical score the entry receives is above a fixed threshold.

20. The method of claim 1, wherein the storage unit used to store the metadata is in a location remote from the input units.

21. A system for positively identifying an individual, comprising:
   a) means for acquiring data from an individual's face, using a plurality of input units of one or more modalities, to generate acquired data;
   b) means for processing the acquired data to generate a geometric image;
   c) means for using a generic geometric model template of the human face;
   d) means for fitting the generic geometric model template to the digital data of a candidate human subject according to a first mathematical method, to create a fitted model;
   e) means for extracting metadata from the fitted model to describe the individual according to a second mathematical method;
   f) means for storing the metadata in a machine readable format in a storage unit;
   g) means for ranking entries of a database of previously stored metadata in a descending order according to their similarity to a new set of metadata; and
   h) means for deciding whether the best ranked entry provides positive identification for the candidate human subject.

22. The system of claim 21, wherein the input units are visible and infrared light cameras.

23. The system of claim 21, further comprising, after the step of acquiring data, a step of using data from one modality of input units to assign a numerical confidence score to points of data from other modalities of input units, for the purpose of weighing them before further processing.

24. The system of claim 23, wherein the data used to assign a numerical confidence score to points of data from the other modalities comes from an infrared light camera.

25. The system of claim 21, further comprising a step of collecting and using data from an individual over time.

26. The system of claim 21, wherein the geometric model template is expressed using a subdivision surface.

27. The system of claim 21, wherein the geometric model template is annotated with anthropometric landmarks.

28. The system of claim 21, wherein the geometric model template is segmented into areas of interest.

29. The system of claim 21, wherein the geometric model template is parameterized over a two dimensional space.

30. The system of claim 21, wherein the first mathematical method is a physics-based deformable model theory with constraints.

31. The system of claim 30, wherein the constraints used are anthropometric.

32. The system of claim 21, wherein the second mathematical method is a wavelet transform.

33. The system of claim 32, further comprising a step of processing wavelet coefficients to be included in the metadata.

34. The system of claim 33, wherein the step of processing wavelet coefficients includes multiplication by a weight mask.

35. The system of claim 33, wherein the step of processing wavelet coefficients includes construction of a trajectory curve.

36. The system of claim 33, wherein the step of processing wavelet coefficients includes construction of an implicit function using radial basis functions.

37. The system of claim 33, wherein the step of processing wavelet coefficients includes construction of an implicit function using distributed approximating functionals.

38. The system of claim 21, wherein the ranking of the entries in the database in a descending order is according to a computation of a numerical score for each entry.

39. The system of claim 21, wherein the decision on whether the best ranked database entry provides positive identification for the individual is based on whether the numerical score the entry receives is above a fixed threshold.

40. The system of claim 21, wherein the storage unit used to store the metadata is in a location remote from the input units.

41. The system of claim 21, wherein the input units are operated by the individual being identified.

42. The system of claim 21, wherein the input units are operated by a person other than the individual being identified.

43. The method of claim 1, wherein the input units are operated by the individual being identified.

44. The method of claim 1, wherein the input units are operated by a person other than the individual being identified.

* * * * *